(12) United States Patent
Badollet

(10) Patent No.: US 9,120,528 B2
(45) Date of Patent: Sep. 1, 2015

(54) HANDLE FOR TWO-WHEELED VEHICLE HANDLEBARS

(76) Inventor: Pascal Badollet, Jussy (CH)

( * ) Notice: Subject to any disclaimer, the term of this patent is extended or adjusted under 35 U.S.C. 154(b) by 6 days.

(21) Appl. No.: 13/389,674

(22) PCT Filed: Aug. 19, 2009

(86) PCT No.: PCT/IB2009/006595
§ 371 (c)(1),
(2), (4) Date: Feb. 9, 2012

(87) PCT Pub. No.: WO2011/021060
PCT Pub. Date: Feb. 24, 2011

(65) Prior Publication Data
US 2012/0137821 A1    Jun. 7, 2012

(51) Int. Cl.
*B62K 21/26* (2006.01)
*B25G 1/10* (2006.01)

(52) U.S. Cl.
CPC ........... *B62K 21/26* (2013.01); *Y10T 74/20828* (2015.01)

(58) Field of Classification Search
CPC ....................................................... B62K 21/26
USPC ............. 74/551.8, 551.9, 558.5; 16/430, 421
See application file for complete search history.

(56) References Cited

U.S. PATENT DOCUMENTS

| 4,495,669 | A | * | 1/1985 | Hooper | 15/143.1 |
| 5,979,015 | A | * | 11/1999 | Tamaribuchi | 16/110.1 |
| 2004/0007087 | A1 | * | 1/2004 | Cummings | 74/551.9 |
| 2008/0034915 | A1 | * | 2/2008 | Bigolin | 74/551.9 |
| 2008/0072702 | A1 | * | 3/2008 | Arnold | 74/551.9 |

FOREIGN PATENT DOCUMENTS

| AT | 377 737 | 4/1985 |
| DE | 91 12 567 | 12/1991 |
| DE | 20 2005 013861 | 1/2007 |
| EP | 1 712 460 | 10/2006 |
| WO | 2004/048187 | 6/2004 |

OTHER PUBLICATIONS

Machine translation of DE 20 2005 013861 from EPO website.*
Machine translation of DE 9112567 using optical character recognition scans from patent.*
International Search Report dated Oct. 30, 2009, corresponding to PCT/IB2009/006595.

* cited by examiner

*Primary Examiner* — Thomas R. Hannon
*Assistant Examiner* — Adam D Rogers
(74) *Attorney, Agent, or Firm* — Young & Thompson

(57) ABSTRACT

Disclosed is a grip (1) for the handlebars (3) of a two-wheeled vehicle and in particular of a bicycle, including an essentially cylindrical main body (2) capable of fitting onto a portion of the handlebars (3) that is rectilinear and essentially perpendicular to the frame of the vehicle. The grip (1) also includes a shaft (4) that is integral with the main body (2), forming an angle with the longitudinal axis of the handlebars of between 30° and 60°, and equipped with an abutment (5) at its free end.

18 Claims, 6 Drawing Sheets

RELATED ART

RELATED ART

HANDLE FOR TWO-WHEELED VEHICLE HANDLEBARS

BACKGROUND OF THE INVENTION

1. Field of the Invention

The object of this invention is a grip for the handlebars of a two-wheeled vehicle, in particular a bicycle.

2. Description of the Related Art

The handlebars of a two-wheeled vehicle and in particular a bicycle are generally made up of a tube, most often metallic, that may or may not be curved, and that includes at least two portions that can be gripped by the user to drive the vehicle. Said portions are most often essentially rectilinear and perpendicular to the frame of the two-wheeled vehicle. For greater comfort and better gripping, said portions of the handlebars are often covered with a grip made of rubber or another plastic material. To drive the vehicle, the user places the palm of his hand against the handlebars and clasps the latter between his thumb and his four other fingers.

However, these conventional grips only mold to the shape of the handlebars. They do not offer a larger support surface and are therefore not at all ergonomic. Articular stresses in the wrist of the user are great and thus contribute to an increase in the wear and tear of the articular surfaces of the wrist and to a decrease in muscle performance. The lack, on these grips, of an adequate area for support adapted to the shape of the wrist can also result in pain in the case of prolonged driving of the vehicle, in particular of a bicycle.

SUMMARY OF THE INVENTION

The goal of this invention is to produce a grip for the handlebars of a two-wheeled vehicle and in particular of a bicycle that is ergonomic and adapts to the hand of the user, providing positioning and comfortable support for the user's wrist, reducing articular stresses and decreasing the risk of pain during prolonged driving of the vehicle, while allowing precise driving of said vehicle.

The object of this invention is a grip for the handlebars of a two-wheeled vehicle, in particular a bicycle. The grip includes a main body of essentially cylindrical shape capable of fitting onto a portion of the handlebars that is rectilinear and essentially perpendicular to a frame of the vehicle. A shaft is integral with the main body, and an angle between the shaft and a longitudinal axis of the handlebars is between 30° and 60°.

Below, the term wrist will refer to all of the bones consisting of the lower end of the radius, the lower end of the cubitus (also called the ulna), and the carpus, itself made up of eight bones divided into two rows. The term hand, for its part, will refer to all of the bones consisting of the carpus, the metacarpus (made up of five metacarpal bones), and 14 phalanges.

BRIEF DESCRIPTION OF THE DRAWING FIGURES

The appended drawings illustrate diagrammatically and by way of nonlimiting example an embodiment of a grip for the handlebars of a two-wheeled vehicle, in particular a bicycle, according to the invention.

Figure 1:
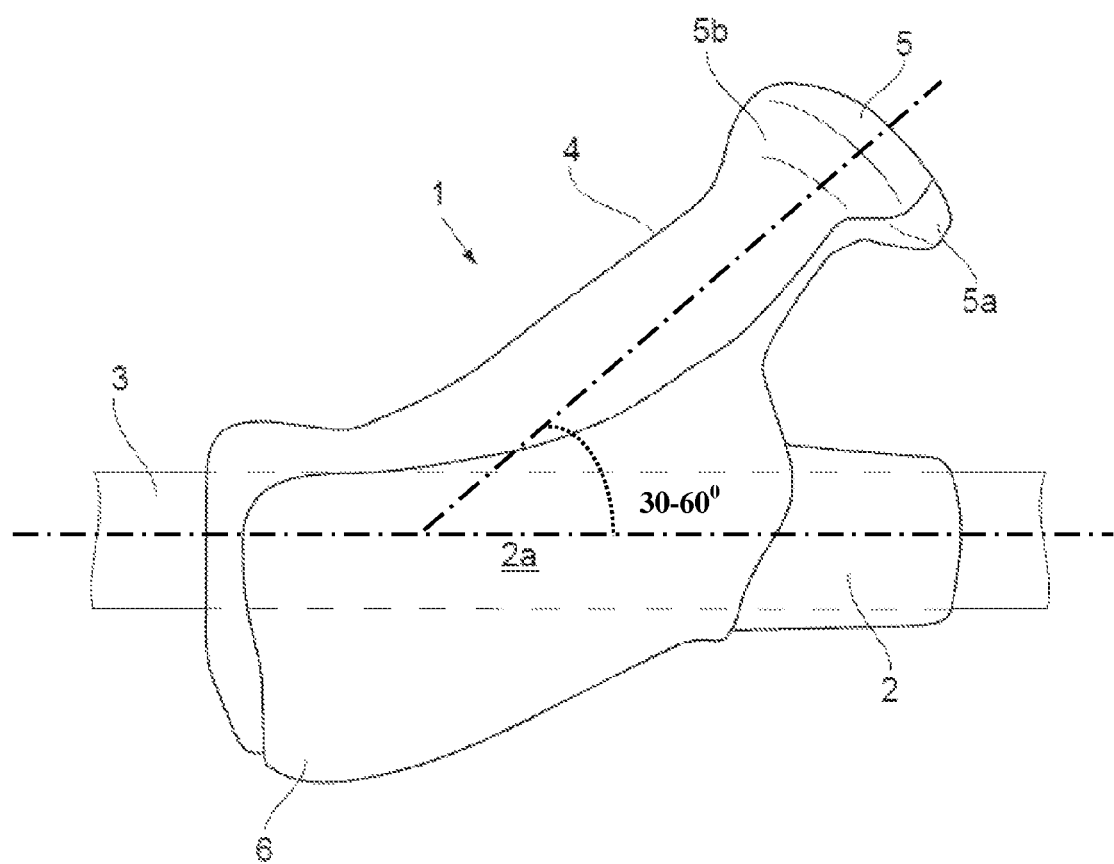
FIG. 1 illustrates a grip according to the invention, mounted on the handlebars of a bicycle, and seen from above relative to the latter.

The grip 1 according to the invention and as illustrated in FIGS. 1 to 4 includes a hollow, elongated main body 2, intended to be mounted on the handlebars 3 of a two-wheeled vehicle, and in particular of a bicycle. Preferably, the grip 1 is mounted on a section of the handlebars 3 that is essentially rectilinear and perpendicular to the frame of the bicycle.

The grip 1 also includes a shaft 4 that is integral with the main body 2 and has an abutment 5 at the end. Preferably, the abutment 5 has a broad and rounded shape.

DETAILED DESCRIPTION OF THE INVENTION

The shaft 4 forms an angle of 30° to 60°, preferably 40°, relative to the longitudinal axis of the handlebars.

Figure 2A:
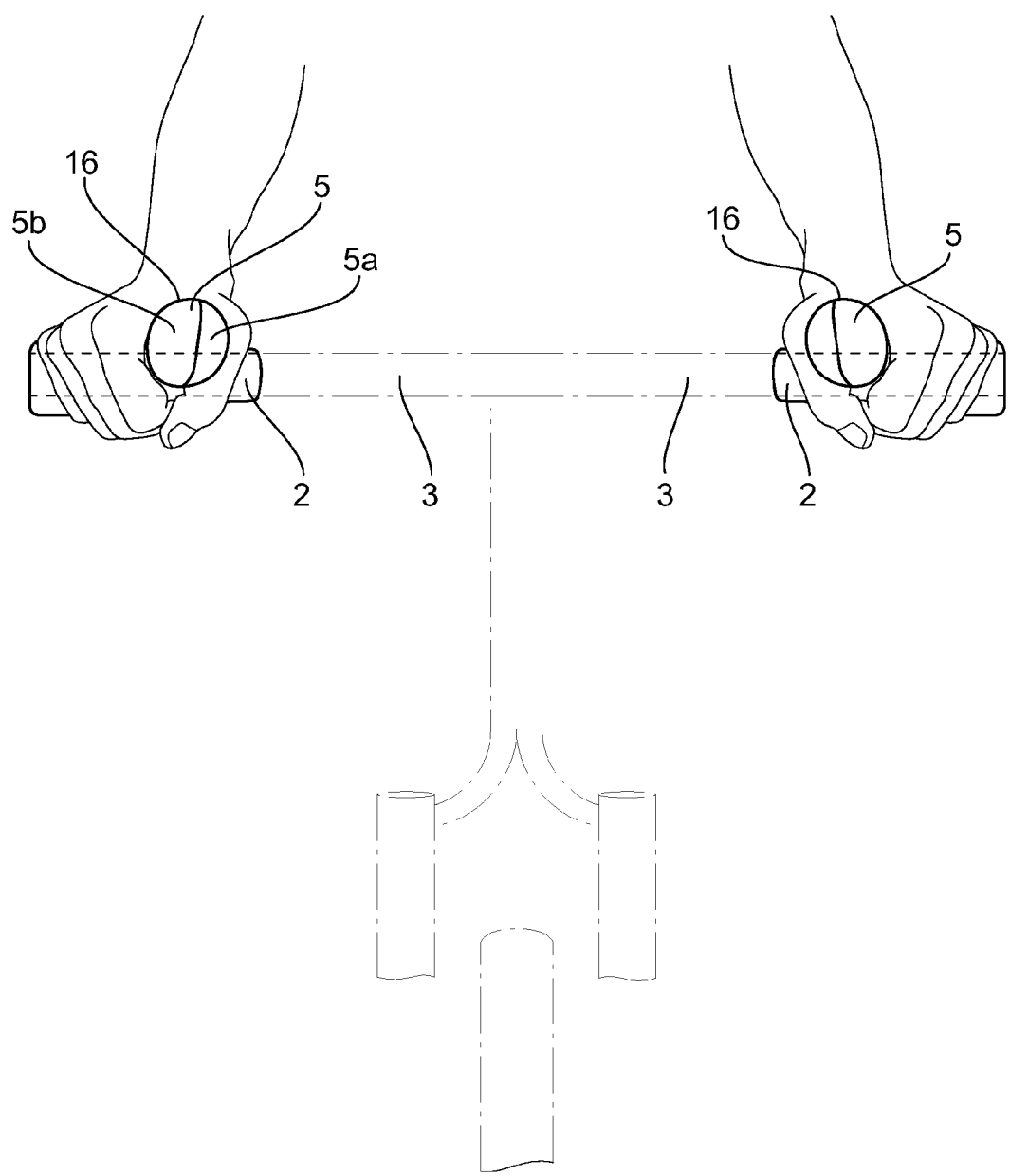
FIGS. 2a and 2b are front views, respectively from the side of the handlebars of a bicycle equipped with two grips according to the invention, as illustrated in FIG. 1, and showing the position of the wrists and hands of a user of said bicycle.
Figure 2B:
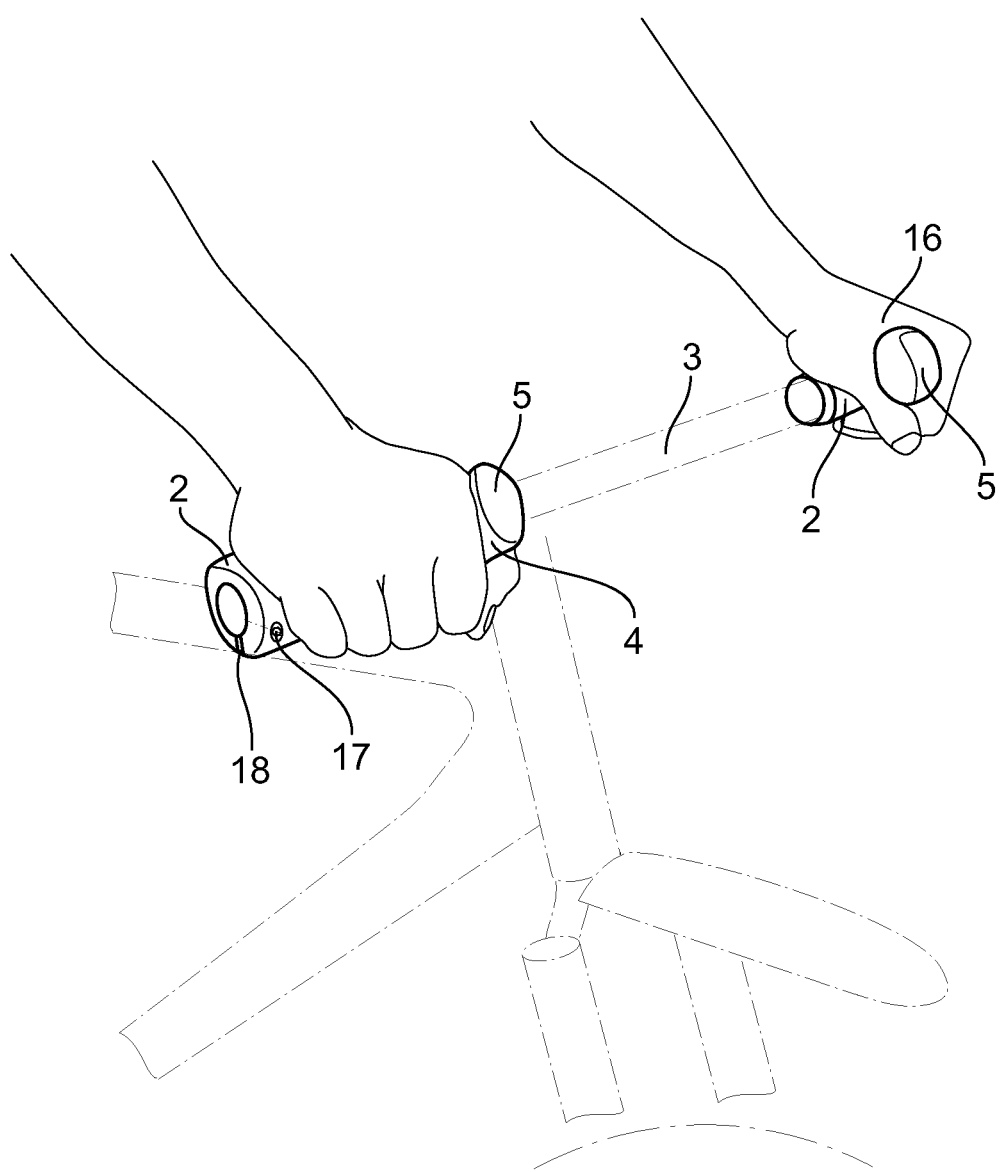
Figure 3:
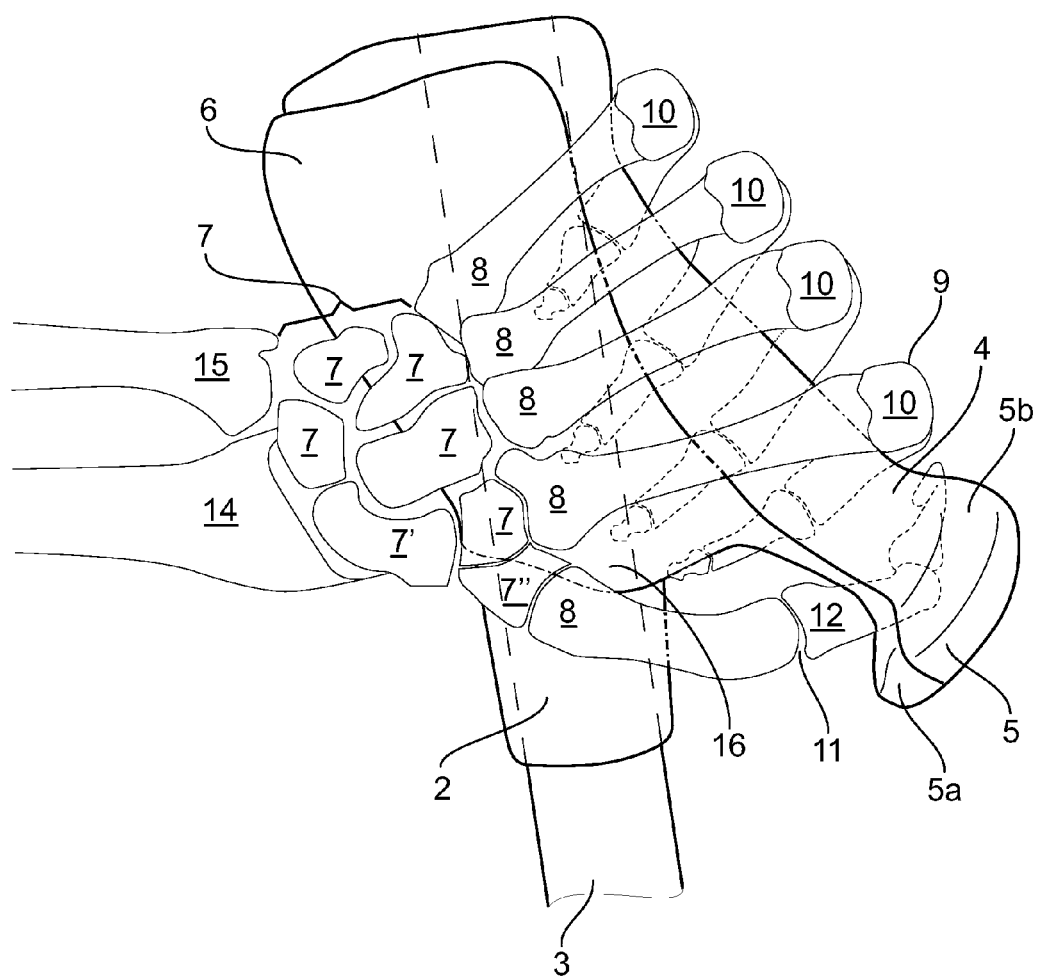
FIG. 3 illustrates all of the bones of the left wrist and hand of a user holding a grip according to the invention and shows the positioning of said bones.
Figure 4:
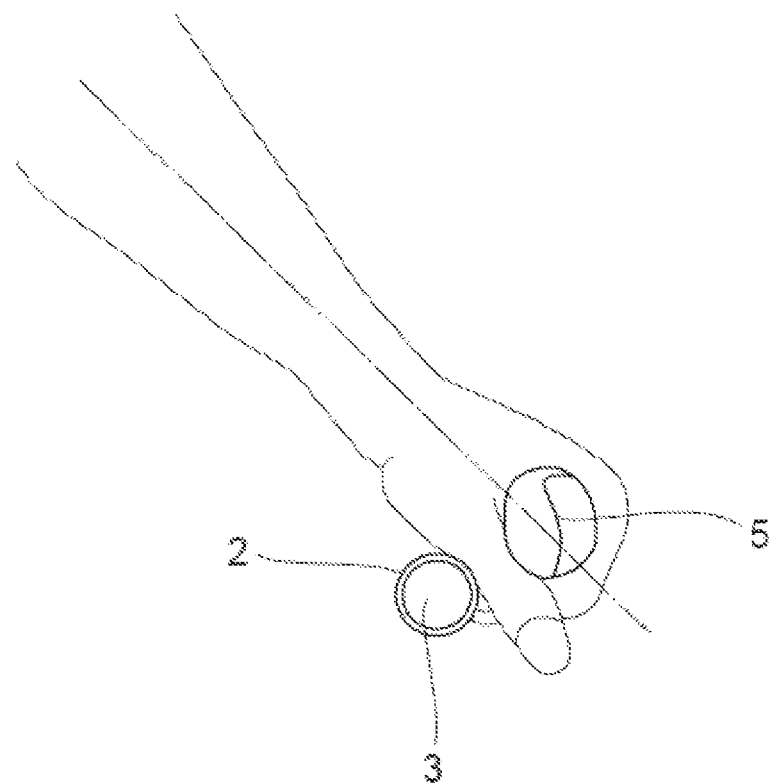
FIG. 4 is a side view of the left forearm, wrist and hand of a user holding the grip according to the invention.

As illustrated in FIGS. 2 to 4, the user places his palm against the main body 2 of the grip 1 and grasps the shaft 4 of said grip between his thumb and his other fingers. Thus, contrary to the use of conventional grips 20 illustrated in FIGS. 5 and 6, the hand of the user does not grasp the handlebars but rather the shaft 4 of the grip 1.

With the grip 1 according to this embodiment, the carpus 7 of the user's hand rests on the grip 1 facing the handlebars and not on top. The main body 2 must therefore be wide enough and has a flat portion 2a that is shaped so as to ensure better support of the carpus 7 and of the palm of the hand. Preferably, the main body 2 also includes a supplementary support area 6 offering alternative, additional support to the driver.

As illustrated in FIGS. 2 to 4, when in working position, the metacarpal bones 8 of the fingers, with the exception of that of the thumb, rest on the shaft 4. The latter is sufficiently long to prevent constant pressing on the intermetacarpal space 16 of the thumb and index finger and, in particular, on the joint 9 between the metacarpal bones 8 and the phalanx 10 of the index finger as well as on the joint 11 of the first phalanx of the thumb 12.

Moreover, the shaft 4 is short enough to provide, in the case of braking, for example, support immediately to the hand thanks to the abutment 5. The latter is also wide enough to offer, in cases of braking or a steep incline, sufficient support to the intermetacarpal space 16 between the first and second metacarpal bones 8 (of the thumb and the index finger respectively) as illustrated in FIGS. 2a and 2b. The abutment 5 thus prevents the hand from slipping. The wide shape of the abutment is also an asset during descent, the abutment 5 blocking the user's hand while assuring him of good support. Moreover, the abutment 5 provides, if desired, additional support to the hand, allowing the driver to change supports and thus stresses and thereby to increase general comfort. Preferably, the abutment 5 has a rounded shape as illustrated in the figures, but could, as a variant, have any other appropriate shape, the essential thing being that it is wide enough to prevent the hand—and in particular the space between the thumb and the index finger—from sliding along the shaft 4.

The dimensions of the shaft 4 and of the abutment 5 thus depend on the morphology of the user and in particular on the size of the palm for the length of the shaft 4 and the span of his hand for the width of the abutment 5. Said dimensions are therefore preferably between 6 and 20 cm and 5 and 10 cm, respectively. Thus, several embodiments can be produced depending on whether the grip according to the invention is designed for a child or adult, female or male user.

The angle formed by the shaft 4 and the longitudinal axis of the handlebars 3, equivalent to between 30° and 60°, corresponds to the angle of pronosupination (axial rotational movement of the forearm bringing the palm downward for pronation and upward for supination) that is optimal for muscle performance of the forearm.

As illustrated in FIG. 2b, the grip 1 includes a slot 18 allowing for placement and easy adjustment of the grip 1 on the handlebars 3. An adjusting screw 17 working with a lock nut (not shown) allows the grip 1 to be fastened by tightening to the handlebars 3 in a chosen position. Any other appropriate means of tightening and adjustment could be used in place of the system consisting of the slot 18, the screw 17, and its lock nut.

Figure 6:
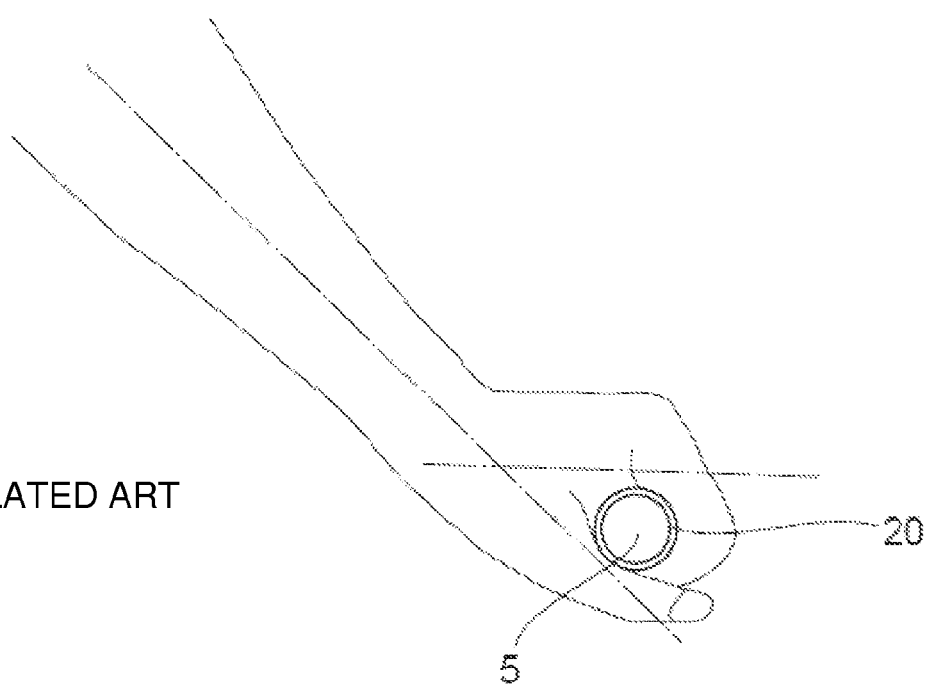
FIG. 6 is a side view of the left wrist, hand, and forearm of a user holding a grip of the prior art.

The bending/extension angle of the wrist is adjusted according to the comfort of the user by turning the grip 1 around the handlebars 3 backward or forward respectively after having unscrewed the adjusting screw 17. As illustrated in FIG. 6, it is practically impossible to adjust the bending and/or the extension of the wrist with a grip of the prior art 20, the wrist always being extended, which in the long term can cause pain.

Figure 5:
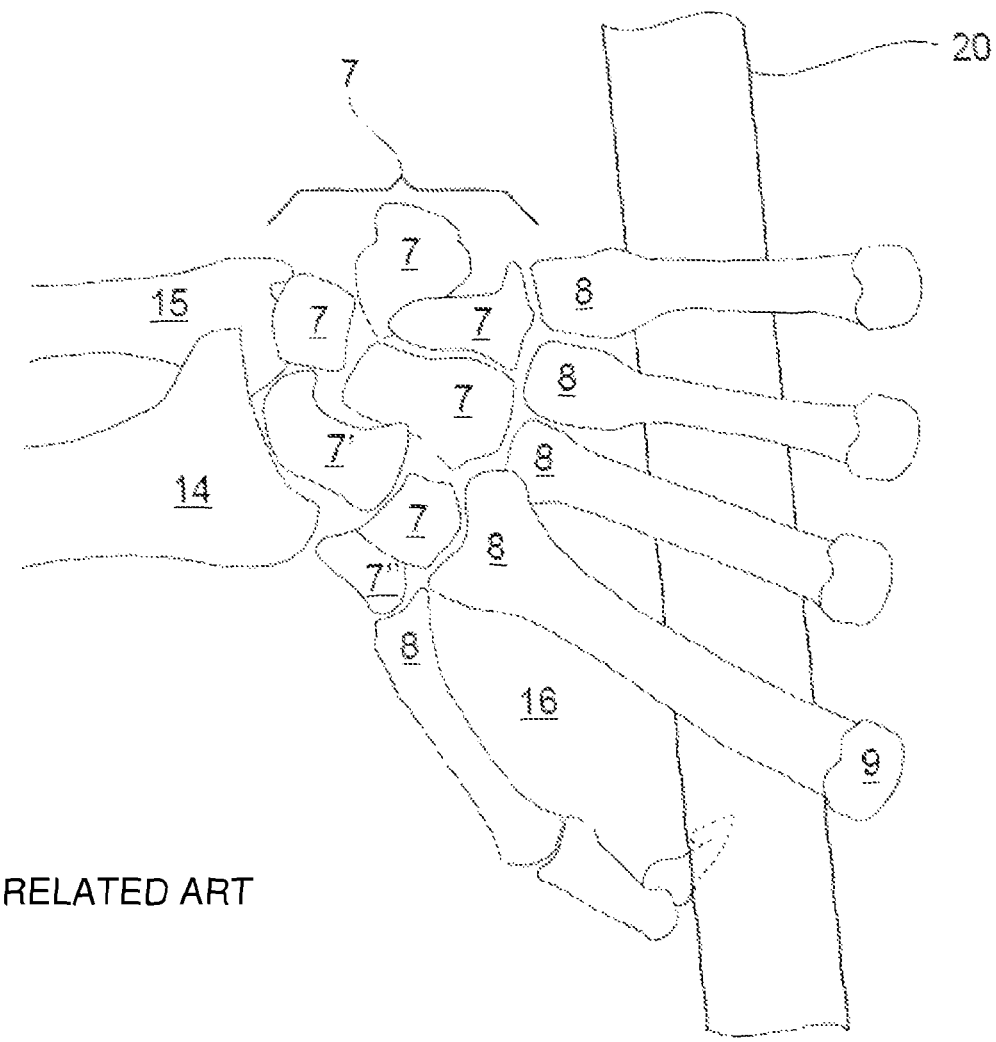
FIG. 5 illustrates all of the bones of the left wrist and hand of a user holding a grip for handlebars of the prior art.

Moreover, as illustrated in FIG. 5, a grip of the prior art 20 makes it necessary for the user to place the carpus 7 at a radial slant relative to the longitudinal axis of the radius 14. This non-ergonomic and non-physiological deviation generates articular stresses particularly on the scaphoid 7' and the trapezium 7" of the carpus 7 of the user's wrist. The grip 1 according to the invention allows for avoidance of such a deviation. Actually, as illustrated in top view in FIG. 3, when in working position, the alignment of the carpus 7 on the radius 14 and the cubitus 15 is optimal (no radial slant). Likewise, contrary to the prior art and as illustrated in side view in FIG. 4, the total alignment between the bones of the carpus 7, the radius 14, and the cubitus 15 is possible with a grip 1 according to the invention, said carpus 7 and said cubitus 15 and radius 14 being on the same plane.

The grips according to the invention provide:
1. A decrease in individual pressing of the joints relative to one another due to the fact that all of the articular surfaces of the joints present to one another their largest available support surfaces, as illustrated in FIG. 3. FIG. 5 provides a view that is comparable to that of FIG. 3, but this time for a grip of the prior art. Pressing of the radius 14 on the external portion of the carpus 7 and particularly the scaphoid 7' and the trapezium 7", as well as of the carpus 7 on the metacarpal bones 8 is observed. The decrease in pressure thus provided allows for:
   a. A decrease in stresses from interarticular pressure, which thereby decreases wear and tear of the joints;
   b. A decrease in joint pain;
   c. Better muscle performance (the less the joints are under stress, the better the muscle contraction and therefore strength). Muscle performance being optimal, this prevents excess muscle contractions and tensions allowing for:
      i. Better arteriovenous circulation;
      ii. Better muscular relaxation;
      iii. Better relaxation of the sensorimotor nerves, which prevents painful sensory irradiation by mechanical tensions of the sensory and motor nerves.
2. A lessening of the permanency of the stresses, by the overall shape of the grip 1, which is softened to mold to the shape of the hand. This has the purpose of avoiding support areas which, in the long run, are disagreeable, painful, and even generate articular wear and tear (osteoarthritis).

The grip according to the invention, and in particular the main body 2 and the shaft 4, are preferably made of hard plastic and can be equipped with an anti-slip coating. Any other appropriate material could be used, such as metal, aluminum, or carbon, for manufacturing the body 2 and the shaft 4.

Preferably, the abutment 5 comprises lateral portions 5a and 5b that can be seen in FIGS. 1 to 3, made up of or covered with a soft, elastic material that has a low value of approximately 18, or in a range of 15-20, on the Shore OO scale (comparatively speaking, on the same scale, chewing gum has a value of 20 and a gel bicycle saddle has a value of between 15 and 30). Likewise, the flat portion 2a of the main body 2, support area for the user's palm, as well as the supplementary support area 6, are preferably made of the same material as the lateral portions 5a and 5b of the abutment 5. Any other more or less soft and elastic material could be used.

The grip 1 according to the invention offers great comfort for the user while allowing him to operate the brake levers (disc brake or brake shoe system) as well as the levers for the gear shifting system of the vehicle, in particular of the bicycle.

By this invention, an ergonomic grip for a set of handlebars of a two-wheeled vehicle and in particular of a bicycle is thus produced, offering great support comfort for the user, which makes it possible to reduce the risk of pain and joint wear and tear while driving the vehicle.

The invention claimed is:

1. Handlebars of a two-wheeled vehicle, comprising:
   two free ends and a central portion extending along a longitudinal axis of the central portion between the free ends; and
   at least one grip fitted to the handlebars, the grip comprising:
      a main body of essentially cylindrical shape capable of fitting onto the central portion of the handlebars;
      a shaft that is integral with the main body, the shaft extending from said main body along a longitudinal axis of the shaft, such that the shaft is setback from either of the free ends of the handlebars,
      the shaft having a free end including an abutment broader or wider than the shaft and extending in a plane essentially perpendicular to the longitudinal axis of the shaft,
   wherein an angle between the longitudinal axis of the shaft and the longitudinal axis of the central portion of the handlebars opens toward the center of said central portion and is between 30° and 60°.

2. The handlebars according to claim 1, wherein the main body has a flattened portion that supports a palm or a carpus of the user's hand.

3. The handlebars according to claim 2, wherein the main body includes a supplementary support area allowing the user to vary the supports and positions of the user's wrist.

4. The handlebars according to claim 2, wherein the main body and the shaft are made of hollow, rigid plastic covered with an anti-slip coating.

5. The handlebars according to claim 2, wherein a supplementary support area and/or the flattened portion of the main body and/or lateral portions of the abutment are made of soft, elastic material with a value on the Shore OO scale between 15 and 20.

6. The handlebars according to claim 2, wherein the angle between the shaft and the longitudinal axis of the handlebars is 40°.

7. The handlebars according to claim 1, wherein the main body includes a supplementary support area allowing the user to vary the supports and positions of the user's wrist.

8. The handlebars according to claim 7, wherein the main body and the shaft are made of hollow, rigid plastic covered with an anti-slip coating.

9. The handlebars according to claim 7, wherein the supplementary support area and/or a flattened portion of the main body and/or lateral portions of the abutment are made of soft, elastic material with a value on the Shore OO scale between 15 and 20.

10. The handlebars according to claim 1, wherein the main body and the shaft are made of hollow, rigid plastic covered with an anti-slip coating.

11. The handlebars according to claim 10, wherein a supplementary support area and/or a flattened portion of the main body and/or lateral portions of the abutment are made of soft, elastic material with a value on the Shore OO scale between 15 and 20.

12. The handlebars according to claim 1, wherein a supplementary support area and/or a flattened portion of the main body and/or lateral portions of the abutment are made of soft, elastic material with a value on the Shore OO scale between 15 and 20.

13. The handlebars according to claim 1, wherein the angle between the shaft and the longitudinal axis of the handlebars is 40°.

14. The handlebars according to claim 1, wherein a length of the shaft and a width of the abutment are between 6 and 20 cm and 5 and 10 cm respectively.

15. The handlebars according to claim 1, wherein the abutment has a round shape.

16. The handlebars according to claim 1, wherein the main body has a flattened portion formed from a soft, elastic material with a value on the Shore OO scale between 15 and 20, so that the flattened portion molds to a shape of the palm or the carpus of the user's hand.

17. Handlebars of a two-wheeled vehicle, comprising:
two free ends and an essentially rectilinear central portion extending along a longitudinal axis between the free ends; and
at least one grip fitted to the handlebars, the grip comprising:
a main body of essentially cylindrical shape capable of fitting onto the central portion of the handlebars;
a shaft that is integral with the main body, the shaft extending from said main body along a longitudinal axis, such that the shaft is setback from either of the free ends of the handlebars,
the shaft having a free end including an abutment broader or wider than the shaft and extending in a plane essentially perpendicular to the longitudinal axis of the shaft,
wherein an angle between the longitudinal axis of the shaft and the longitudinal axis of the central portion of the handlebars opens toward the center of said central portion and is between 30° and 60°.

18. The handlebars according to claim 17, wherein the main body includes a supplementary support area allowing the user to vary the supports and positions of the user's wrist.

* * * * *